United States Patent
Duan et al.

(10) Patent No.: US 9,088,888 B2
(45) Date of Patent: Jul. 21, 2015

(54) SECURE WIRELESS COMMUNICATION USING RATE-ADAPTIVE CODES

(75) Inventors: Chunjie Duan, Brookline, MA (US); Yige Wang, Natick, MA (US); Wei Liu, Syracuse, NY (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 525 days.

(21) Appl. No.: 12/965,580

(22) Filed: Dec. 10, 2010

(65) Prior Publication Data

US 2012/0148046 A1   Jun. 14, 2012

(51) Int. Cl.
| | | |
|---|---|---|
| H04W 12/02 | (2009.01) | |
| H04L 29/06 | (2006.01) | |
| H04L 1/00 | (2006.01) | |
| H04L 1/18 | (2006.01) | |
| H04L 9/08 | (2006.01) | |
| H03M 13/35 | (2006.01) | |
| H03M 13/37 | (2006.01) | |
| H03M 13/00 | (2006.01) | |
| H04W 12/04 | (2009.01) | |

(52) U.S. Cl.
CPC ............ *H04W 12/02* (2013.01); *H03M 13/353* (2013.01); *H03M 13/3761* (2013.01); *H03M 13/6393* (2013.01); *H04L 1/0041* (2013.01); *H04L 1/18* (2013.01); *H04L 9/0875* (2013.01); *H04L 63/0428* (2013.01); *H04L 63/061* (2013.01); *H04L 2209/80* (2013.01); *H04W 12/04* (2013.01)

(58) Field of Classification Search
CPC ............ H04L 63/04; H04L 63/0428–63/0442; H04L 63/0457; H04L 63/06; H04L 63/068; H04L 63/12; H04L 63/123; H04L 9/06; H04L 9/0618–9/0625; H04L 9/065; H04L 9/0875; H04L 2209/80; H04L 1/0009; H04L 1/0013; H04L 1/0041; H04L 1/16; H04L 1/18; G06F 21/60; G06F 21/606; H04W 12/04
USPC ......... 380/247, 249, 255, 260–262, 270, 274, 380/42; 713/150, 160, 400, 500–503; 340/324, 350, 503–504, 507, 509
See application file for complete search history.

(56) References Cited

U.S. PATENT DOCUMENTS

| | | | | |
|---|---|---|---|---|
| 6,307,487 | B1 * | 10/2001 | Luby ............................... | 341/50 |
| 6,678,856 | B1 * | 1/2004 | Jordan et al. ................... | 714/755 |
| 6,810,502 | B2 * | 10/2004 | Eidson et al. .................. | 714/786 |
| 7,050,511 | B2 * | 5/2006 | Jeong et al. .................... | 375/301 |

(Continued)

OTHER PUBLICATIONS

Pukkila, Markku "Channel Estimation Modeling" [Online], Dec. 19, 2000 [Retrieved on: Nov. 17, 2012], Nokia Research Center, [Retrieved from: http://www.ee.oulu.fi/~zoquinta/CSPII/chan_est.pdf].*

*Primary Examiner* — Saleh Najjar
*Assistant Examiner* — Eric W Shepperd
(74) *Attorney, Agent, or Firm* — Dirk Brinkman; Gene Vinokur

(57) ABSTRACT

Data are communicated in a wireless network, between a transmitter and a receiver. The transmitter estimates a first channel response between the receiver and the transmitter, and generates a first key based on the first channel response. The data are encoded at the transmitter using a rate-adaptive code to produce encoded data, and scrambled using the first key before broadcasting. Subsequently, the receiver can estimate a second channel response to generate a second key to be used to descramble the broadcast data.

12 Claims, 7 Drawing Sheets

(56) References Cited

U.S. PATENT DOCUMENTS

| | | | |
|---|---|---|---|
| 7,068,729 B2 * | 6/2006 | Shokrollahi et al. | 375/296 |
| 7,310,768 B2 * | 12/2007 | Eidson et al. | 714/786 |
| 7,484,165 B2 * | 1/2009 | Griesser et al. | 714/782 |
| 7,765,402 B2 * | 7/2010 | Clark et al. | 713/168 |
| 7,991,160 B2 * | 8/2011 | Guccione et al. | 380/270 |
| 8,280,046 B2 * | 10/2012 | Rudolf et al. | 380/44 |
| 2003/0022629 A1 * | 1/2003 | Miyoshi et al. | 455/67.3 |
| 2003/0039229 A1 * | 2/2003 | Ostman | 370/335 |
| 2003/0095498 A1 * | 5/2003 | Sato et al. | 370/208 |
| 2003/0112978 A1 * | 6/2003 | Rodman et al. | 380/277 |
| 2004/0052306 A1 * | 3/2004 | Ibrahim et al. | 375/152 |
| 2006/0133338 A1 * | 6/2006 | Reznik et al. | 370/338 |
| 2007/0036353 A1 * | 2/2007 | Reznik et al. | 380/30 |
| 2007/0165845 A1 * | 7/2007 | Ye et al. | 380/30 |
| 2007/0177729 A1 * | 8/2007 | Reznik et al. | 380/44 |
| 2008/0219374 A1 * | 9/2008 | Fernandez-Corbaton et al. | 375/267 |
| 2009/0141900 A1 * | 6/2009 | Ye et al. | 380/270 |
| 2009/0225895 A1 * | 9/2009 | Sheu et al. | 375/295 |
| 2010/0034389 A1 * | 2/2010 | Sakharov | 380/277 |
| 2010/0070991 A1 * | 3/2010 | Kaag et al. | 725/31 |
| 2010/0185791 A1 * | 7/2010 | Pons et al. | 710/30 |
| 2010/0265897 A1 * | 10/2010 | Kwon et al. | 370/329 |
| 2010/0318796 A1 * | 12/2010 | Reznik et al. | 713/168 |
| 2011/0078453 A1 * | 3/2011 | Mueck et al. | 713/179 |
| 2012/0015653 A1 * | 1/2012 | Paliwal et al. | 455/435.1 |
| 2012/0140922 A1 * | 6/2012 | Annavajjala et al. | 380/44 |

\* cited by examiner

100

SECURE WIRELESS COMMUNICATION USING RATE-ADAPTIVE CODES

FIELD OF THE INVENTION

This invention relates generally to wireless communications, and more particularly to secure communications in wireless networks.

BACKGROUND OF THE INVENTION

In wired communication networks, signal energy is mostly confined in a physical medium, such as conductive wires or optical fibers. Hence, signals can only be accessed by physically attaching to the medium.

In wireless networks, any receiver within range of the transmitter can intercept the signals. Therefore, conventionally secure communication typically uses cryptography and asymmetric public and private keys at the transmitter and the receiver. A public key infrastructure (PKI) generates, distributes and maintains the public keys, in which a trusted certificate authority (CA) binds all the public keys with respective user identity and issues a public key certificate to the respective user. In order to establish secure communication, the transmitter first verifies the receiver's public key certificate. After the public key is verified, messages are encrypted using the receiver's public key, and the messages can only be decrypted using the corresponding private key. Generation of public keys requires significant computational overhead.

For many wireless networks, such as ad hoc network, access to a PKI is difficult, or unavailable. Wireless nodes do not have the computational power to generate public keys either. In such cases, security communication in such wireless networks becomes a challenge. Given this, realizing security in wireless communication networks is of great interest.

Recently, physical layer security has been investigated for wireless networks. Based on information theory, messages transmitted at bit rates higher than a channel capacity cannot be decoded correctly. It is therefore possible to transmit a message to intended users securely, providing that the channels between the transmitter and intended receivers have higher capacity than channels between the transmitter and eavesdroppers. However, in practice, it is difficult to guarantee that such a condition is satisfied.

Another approach generates secret session keys in a wireless node. The reciprocity of wireless channels enables two nodes to generate a pair of secret keys that are made identical by quantizing parameters of the channel. After a matching pair of keys are generated by each node, the keys can be used to encrypt messages between the nodes. Because eavesdroppers have wireless channels that are different than the two nodes, the eavesdroppers cannot produce the same keys, and the secure communication is guaranteed. For that approach, it is essential that the independently generated keys match completely. However, due to the noise, interference and hardware impairment, it is not always guaranteed that the keys generated by a pair of wireless nodes are exactly the same.

Low-density parity check (LDPC) codes can be used for forward error correction (FEC) codes, and are widely used to reduce channel noise and key mismatches. Given the channel statistics, one can design good LDPC codes that perform very closely to the channel capacity. However, in reality, channel parameters cannot always be obtained accurately. Moreover, the channel can be time-variant. Therefore the code rate should be determined dynamically.

SUMMARY OF THE INVENTION

The invention describes a method for securely and reliably communicating data between a transmitter and a receiver, generally transceivers or nodes according to embodiments of the invention.

The transmitter encodes the data using a rate-adaptive code to produce a bit stream of encoded data. The rate-adaptive code can be any code that has the capability to incrementally add redundancy, such as rateless codes, rate-compatible LDPC, or convolutional codes, etc. Rateless codes do not exhibit a fixed code rate because the codes can potentially generate a sequence of infinite number of encoded bits, while rate-compatible LDPC codes adjust the code rate by "puncturing" parity check bits. Both of codes have a carefully designed structure, where encoded data is transmitted incrementally to achieve different levels of error correction capability.

The transmitter encrypts the encoded data with a key $K_a$ and transmits a small segment of the encoded data. If the transmitter receives a negative acknowledgement (NACK) from the receiver, or a time out, then additional segments of the encoded bit stream are transmitted. The transmitter keeps transmitting more segments until an acknowledgment (ACK) is received.

The receiver first decrypts the received bit stream with a key $K_b$, which is highly correlated with the key $K_a$, but not always exactly the same. The receiver tries to decode the message using all data received. If successful, the receiver sends the ACK to the transmitter of the encoded data. It unsuccessful, the receiver signals the transmitter to send more segments by either sending the NACK, or doing nothing.

DETAILED DESCRIPTION OF THE PREFERRED EMBODIMENT

Key Generation

Figure 1:
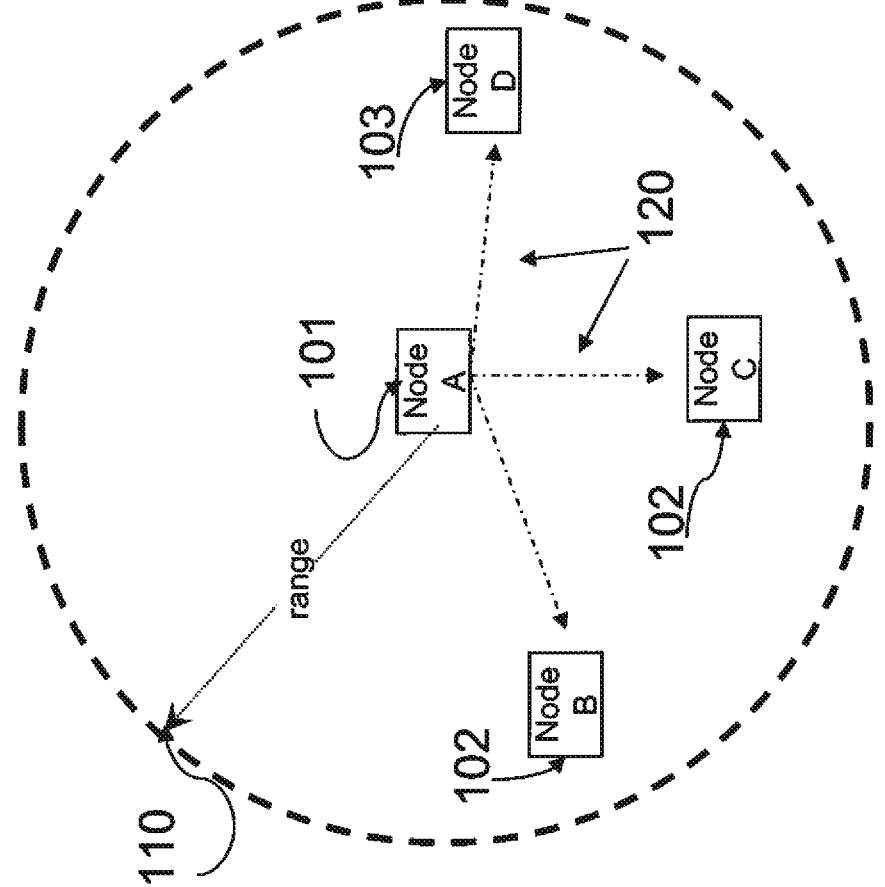
FIG. 1 is a schematic of a wireless network that uses embodiments of the invention.

FIG. 1 shows a wireless communication network 100 according to embodiments of that includes a transmitting node A 101, and receiving nodes B-C 102 and D 103 within a receiving range r 110 of the transmitting node. Any node within the receiving range can intercept the broadcast signals via channels 120. For example, node D 103 could be an eavesdropper.

Due to an open medium, a wireless transmission is very vulnerable to eavesdropping because potentially any receiver can intercept wireless broadcasts. Therefore, security is an extremely important issue in wireless communications.

Figure 2:
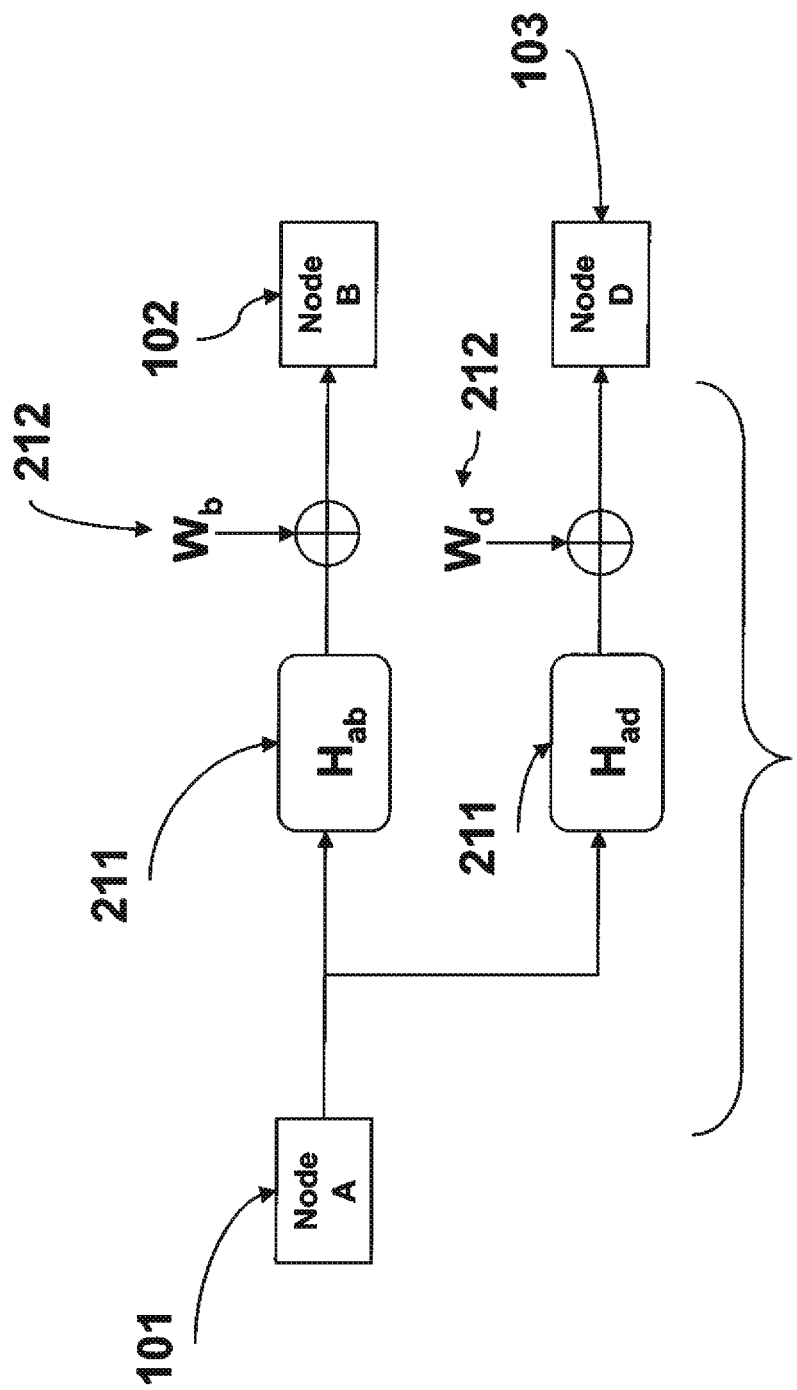
FIG. 2 is a schematic of a channel between two nodes in the wireless network of FIG. 1.

FIG. 2 shows a channel 200 between the transmitter 101 and one legitimate receiver (node B) 102, and one eavesdropper node (node D) 103. The received signals of both legitimate node and eavesdropper can be modeled as the transmitted signals multiplied by the respective channel responses H 211 and added to some noise W 212.

Two wireless nodes (A and B) can generate a pair of keys independently by estimating the channel between the node and the other node. Without noise and other hardware impairment, the channel estimate of node A and that of node B, denoted as $H_{ab}$ and $H_{ba}$, respectively, are theoretically identical, i.e., $H_{ab}=H_{ba}=H$. However, because of environmental noise and hardware impairment, the actual channels estimated by each node are often not exactly identical, but highly correlated. The estimated channel can be expressed as:

$$\hat{H}_{ab}=H_{ab}+z_a, \text{ and}$$

$$\hat{H}_{ba}=H_{ba}+z_b,$$

where $Z_a$ and $Z_b$ are noise observed by node A and node B, respectively.

Node A can generate a key $K_a$ based on a channel estimate $\hat{H}_{ab}$, and node B generates a key $K_b$ based on a channel estimate $\hat{H}_{ba}$. Given that $\hat{H}_{ab} \approx \hat{H}_{ba}$, $K_a$ and $K_b$ are not always identical, but typically highly correlated.

The eavesdropper node D 103 can also estimate the channel, $\hat{H}_{da}$ or $\hat{H}_{db}$, and generate a key $K_d$ based on either channel estimate, or a combination of both. However, the correlation between eavesdropper's channels and H is low, and therefore a mismatch rate using key $K_d$ is much higher than the rate obtained using keys $K_a$ and $K_b$. Here, a mismatch rate predetermined threshold is defined as the ratio of the number of mismatching bits to the total number of bits in the second (or first) key.

Conventional secure communications using encryption require that keys $K_a$ and $K_b$ are perfectly matched. That is, the receiver cannot decode the data correctly if there are mismatched bits between key pair $K_a$ and $K_b$.

In contrast, the embodiments of the invention describe a method to transmit data securely using a pair of key that are not perfectly matched, but correlated.

Figure 3:
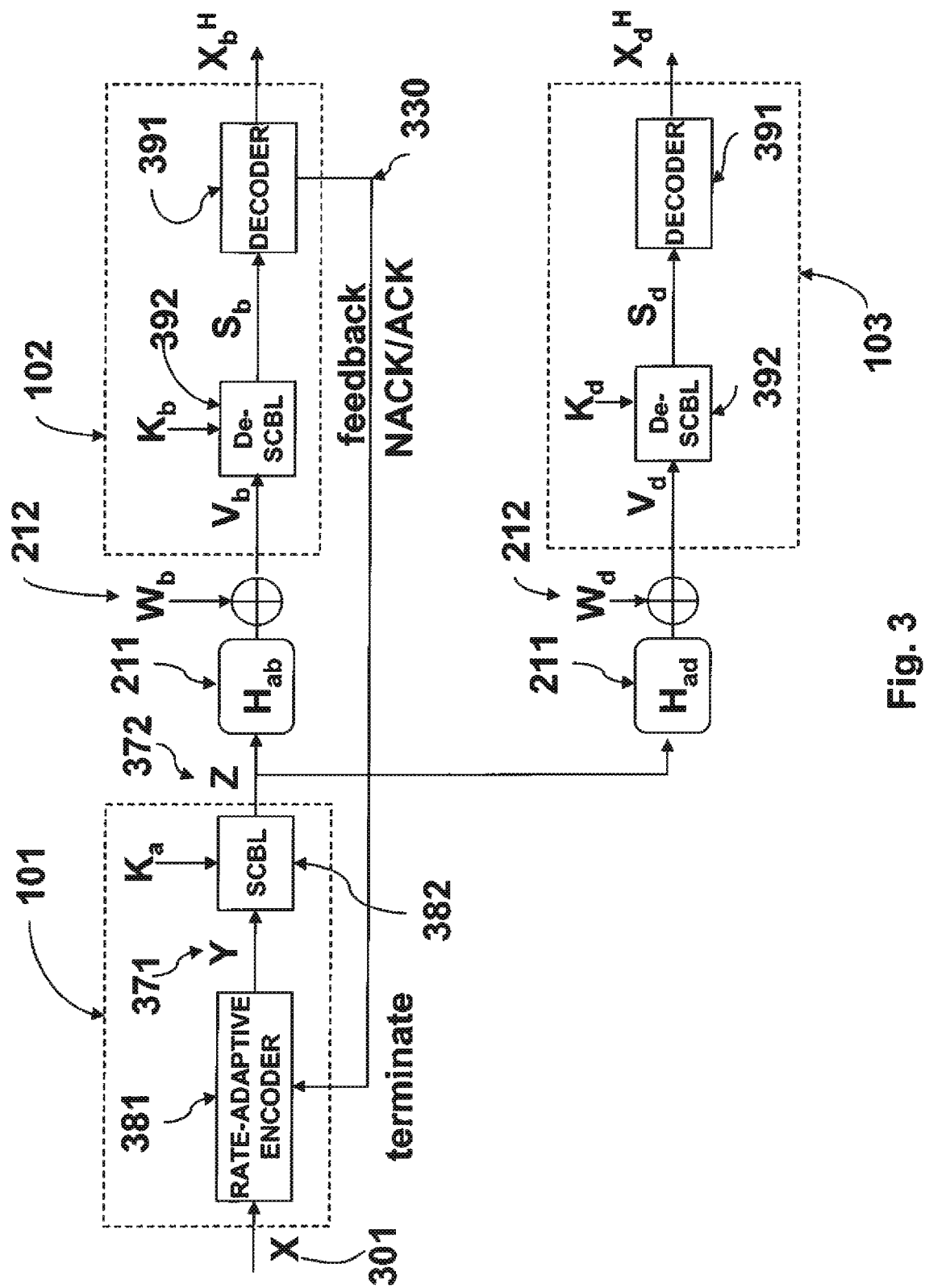
FIG. 3 is a block diagram of a transmitter and a receiver according to embodiments of the invention.

FIG. 3 shows one embodiment of the invention. The transmitter 101 encodes a kbit data vector $X=[x_1, x_2, \ldots, x_k]$ 301 using a rate-adaptive encoder 381, which can be a Luby transform (LT) code, a raptor code, a rate-compatible LDPC code, etc., to produce a coded bitstream of symbols Y 371. The length of Y can be potentially very long. The longer the length of the stream Y 371, the lower the transmission rate and the higher error correction capability the code.

The transmitter gradually adjusts the error correction capability of the transmitted code according to feedback 330 from the receiver 102. If the feedback indicates a failure (NACK) in decoding, the transmitter increase the error correction capability by sending additional symbols of Y 371 to assist the receiver to decode the bit stream.

The transmitter 101 also scrambles (SCBL) 382 the coded data Y 371 with the key $K_a$ to scrambled data Z 372. The transmitter 101 broadcasts the first n bits of Z, denoted as Z(1:n). The bits Z(1:n) are received at the intended receiver node B 102 as $V_b$(1:n).

The receiver descrambles 392 the bits $V_b$ (1:n) using the first n bits of the key $K_b$(1:n). If the length of the key is less than n, then a repeated key is used.

The descrambled data are $S_b$(1:n). A decoder 391 in the receiver attempts to decode data (message) X using $S_b$(1:n).

The receiver sends a feedback 330 to the transmitter according to the decoding result. If the data are decoded successfully, the receiver then sends the ACK to the transmitter. If decoding fails, the receiver can either explicitly send the NACK, or do so implicitly by not transmitting anything.

If after broadcasting the $t^{th}$ segment of Z, i.e., Z((t−1)n+1:tn), the transmitter 101 receives the ACK message, it stops transmitting additional symbols in Z and is ready for the next input data (message).

If after broadcasting the $t^{th}$ segment of Z, i.e., Z((t−1)n+1:tn), the transmitter 101 receives the NACK, or times out in the case of the implicit NACK), and continues by transmitting additional n-bit of Z, Z(tn+1:tn+n).

The scrambling 382 performs symbol-wise operation. Each output symbol z(m) is generated with input symbol y(m) and a key symbol $k_a$(m). As an example, if y(m) and $k_a$(m) are binary, the scrambling can be done by applying an exclusive OR (XOR) operation on the encoded data and the first key, i.e., z(m) y(m) XOR $k_a$(m). Other methods, such as rotating the phase of the symbols, can also be used. If a length q of the key is less than m, a repeated key is used, i.e., z(m)=y(m) XOR $k_a$(m mod q).

The receiver 102 can include an individual descrambling block 392 and a decoder block 391. The descrambling block 392 takes the received symbol $v_b$(m) and the key $k_b$(m), and generates a descrambled symbol $s_b$(m). If both $v_b$(m) and $k_b$(m) are binary, then the XOR operation can be used in the descrambler.

If reliability information for $v_b$(m) or $k_b$(m) or both are known, then an advanced soft descrambling scheme can be used. We denote the reliability of bit s, given an observed value r, by $L=\log(Pr(s=0|r)/Pr(s=1|r))$. Then, the reliability of the received data is $L_c(m)=\log(Pr(z(m)=0|v_b(m))/Pr(z(m)=1|v_b(m)))$. The reliability of individual bits in a key $L_k$(m) can be obtained from the key generation process. If the key is not known, $K_b$ can be treated as error free, i.e., considering the value of $L_k$(m) as infinity. When the key $L_k$(m) is known, the soft output information $L_d$(m) of the $m^{th}$ symbol after descrambling can be determined according to $$L_d(m) = 2\tanh^{-1}\left(\tanh\left(\frac{L_c(m)}{2}\right) \cdot \tanh\left(\frac{L_k(m)}{2}\right)\right).$$

Otherwise, if the key $L_k$(m) is unknown, then $$L_d(m)=(1-2 \cdot K_b(m)) \cdot L_c(m).$$

A decoder capable of accepting soft input can be used and $L_d$ can be used to initialize the decoding process.

If the eavesdropper node 103 has the same structure as a legitimate receiver, as shown in FIG. 3, the eavesdropper descrambles the input data $V_d$ with key sequence $K_d$. Given that the correlation between $K_d$ and $K_a$ is low, the eavesdropper cannot correctly decode the data, i.e., $X_d^H \neq X$. Therefore, the invented method allows data to be transmitted securely only to intended receivers.

Figure 4:
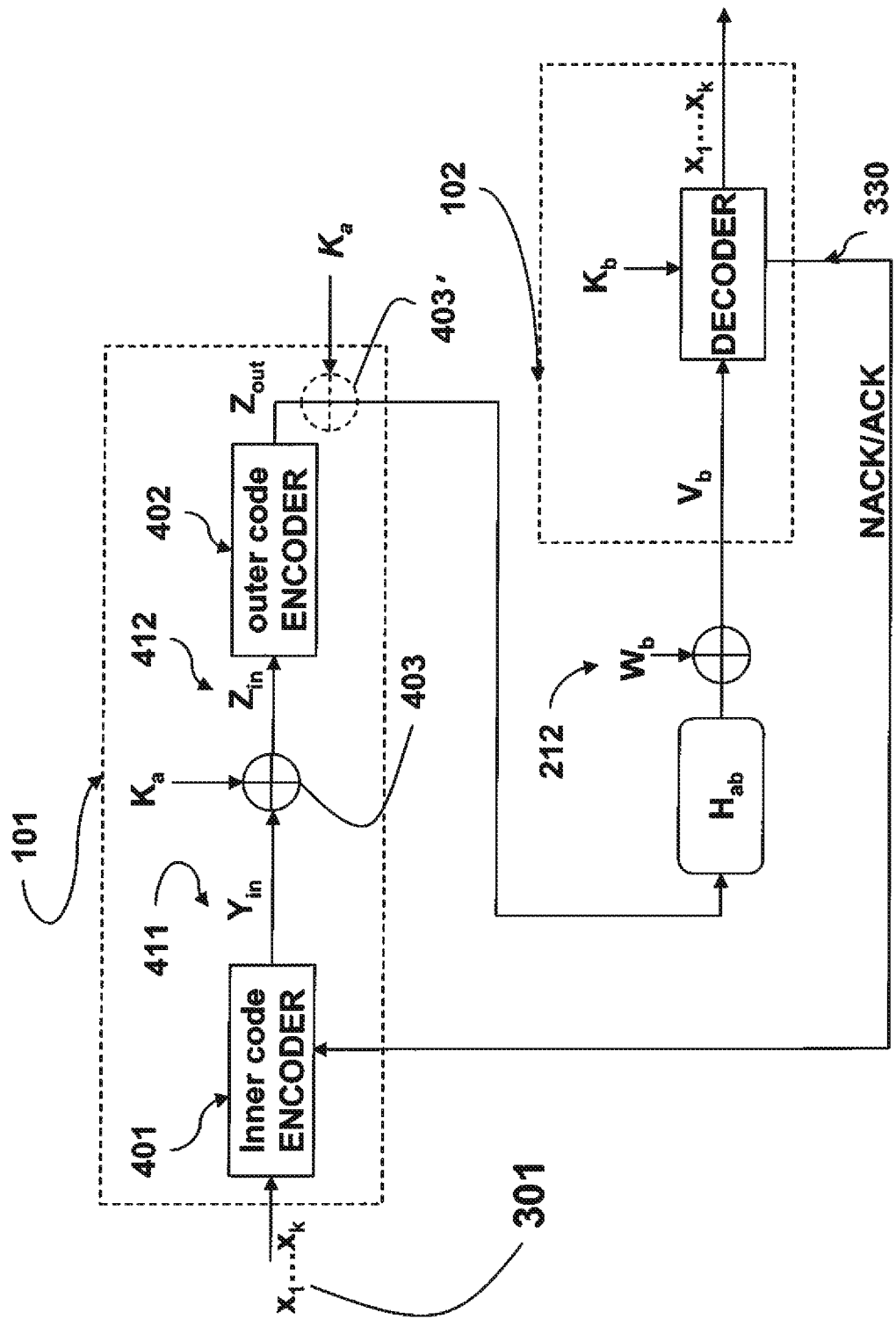
FIG. 4 is a schematic of another embodiment of a transmitter and a receiver according to embodiments of the invention.

FIG. 4 shows another embodiment of the invention where concatenated rate-adaptive codes, e.g., raptor codes, are used. The transmitter 101 of a concatenated rate-adaptive code includes an inner code encoder 401 and an outer code encoder 402, and scrambling 403 between the two encoders instead of being at the output of the outer encoder as in FIG. 3. Alternatively, the scrambling 403 is instead performed on an output of the outer decoder.

The transmitter 101 first encodes 401 the input data X 301 with an inner code. The output of the inner encoder, $Y_{in}$ 411, is then scrambled 403 with $K_a$ to produce a scrambled sequence $Z_{in}$ 412. The outer encoder 402 takes $Z_{in}$ as inputs and outputs $Z_{out}$, which is broadcast.

The receiver 102 decodes the received coded signal $V_b$ with the side information $K_b$. If the receiver does not decode successfully, the receiver sends an implicit or explicit NACK to the transmitter 101. Otherwise, the receiver sends an ACK to the transmitter 101. During the broadcasting, the outer code encoder 402 in the transmitter 101 continuously produces additional bits until the ACK is received from the receiver 102.

Figure 5:
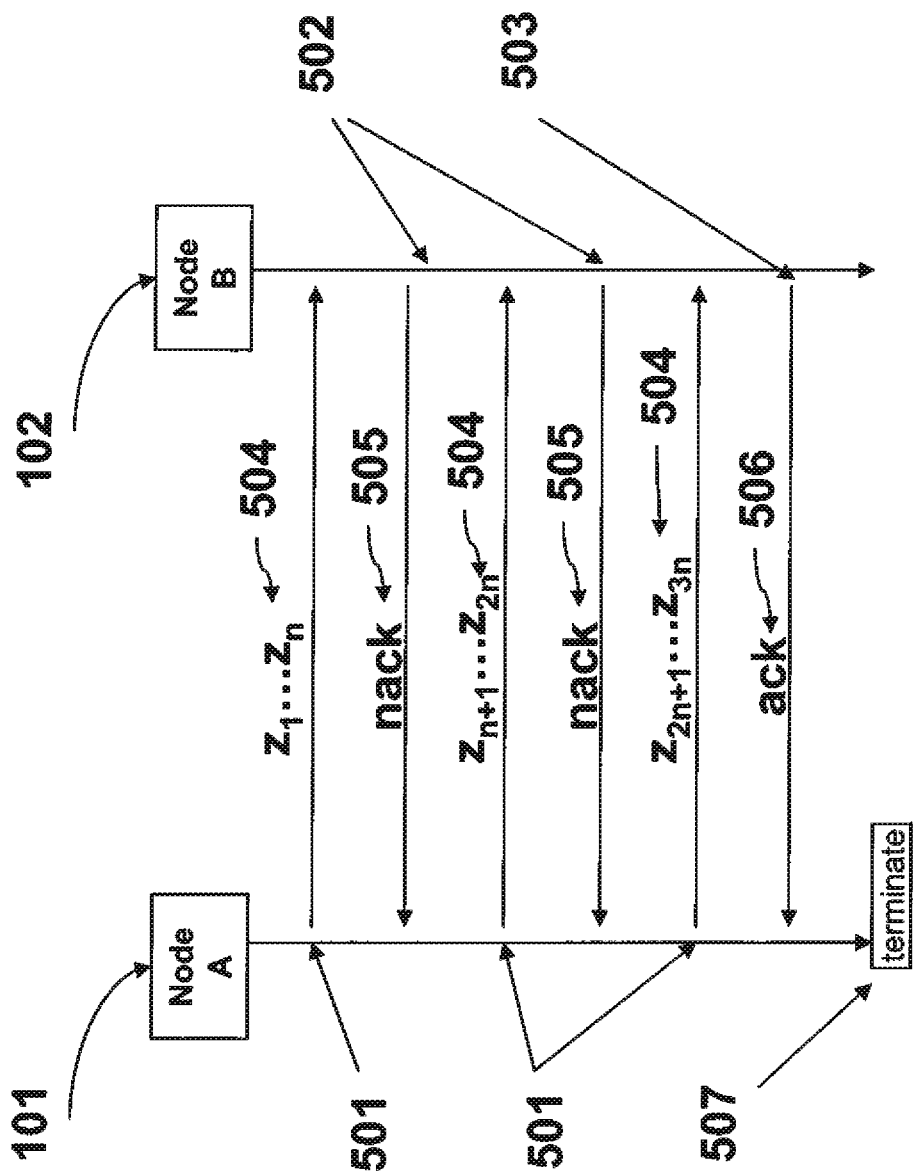
FIG. 5 is a schematic of a transmission protocol according to embodiments of the invention.

FIG. 5 summarizes the protocol. Upon receiving a new input data, node A 101 encodes and scrambles the data and transmits 501 a portion of the scrambled, encoded data 504. A NACK 505 is sent 502 by node B 102 if the scrambled data cannot be decoded, and another portion of the scrambled data is sent. That is, the transmitter continuous to broadcast the scrambled data, produced by the rate-adaptive encoder, until the data are decoded successfully.

If the message is decoded correctly, then the node B 102 sends 503 the ACK 506, and broadcasting terminate 507.

Effect of the Invention

Compared to fixed rate transmissions, the invention can improve the security level of wireless communication networks. The invention is especially effective in a time variant channel.

Figure 6:
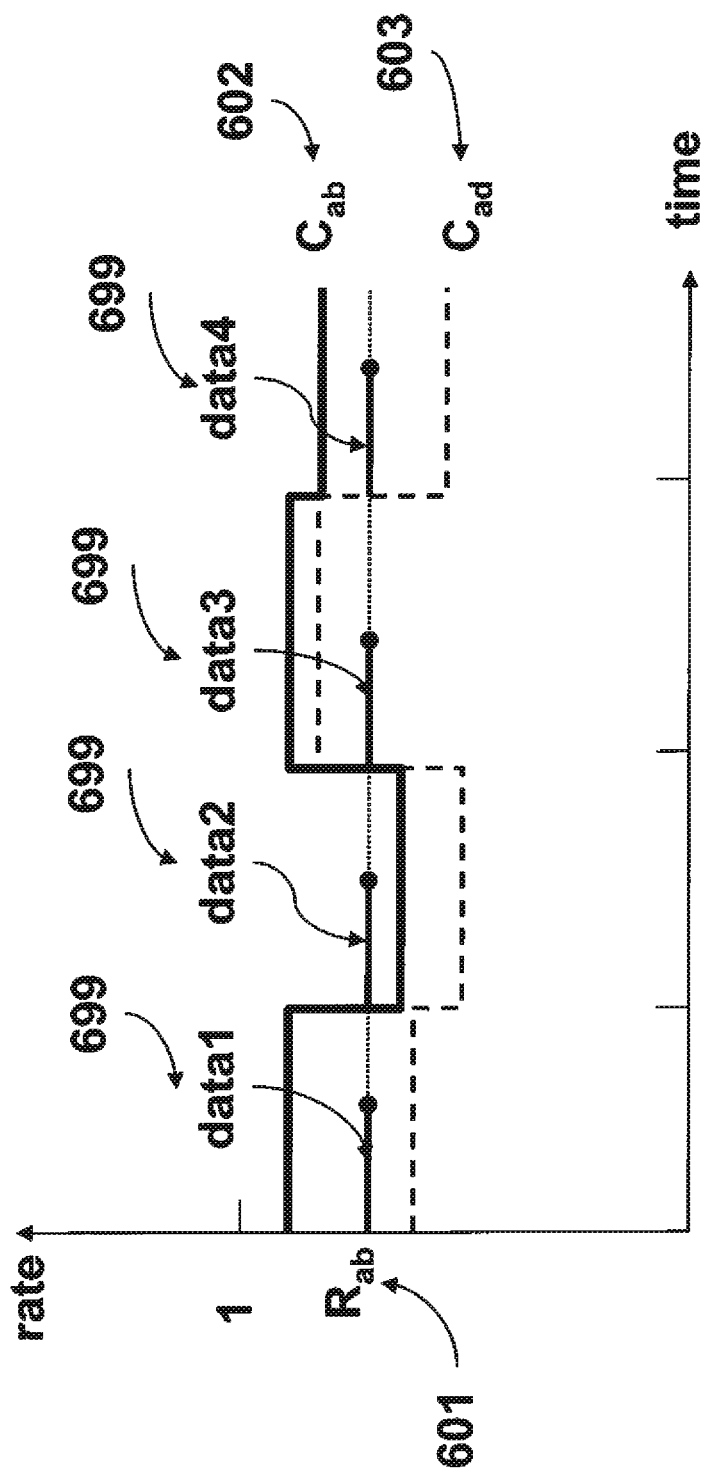
FIG. 6 is a timing diagram of rate and channel capacity using prior art fixed rate transmission.

FIG. 6 shows prior art transmissions where fixed rate (dotted line) is used. Data 699 are transmitted at a pre-determined rate $R_{ab}$ 601 regardless of the channel capacity at the time of the transmission. Such a method has two drawbacks:

1) when the channel capacity (solid line) of the intended user $C_{ab}$ 602 is lower than the pre-determined rate $R_{ab}$ 601, the transmission is unsuccessful; and 2) when the channel capacity (dash line) of the eavesdropper $C_{ad}$ 603 is higher than $R_{ab}$ 601, the eavesdropper node 103 can decode the data, which leads to an unsecure transmission.

Figure 7:
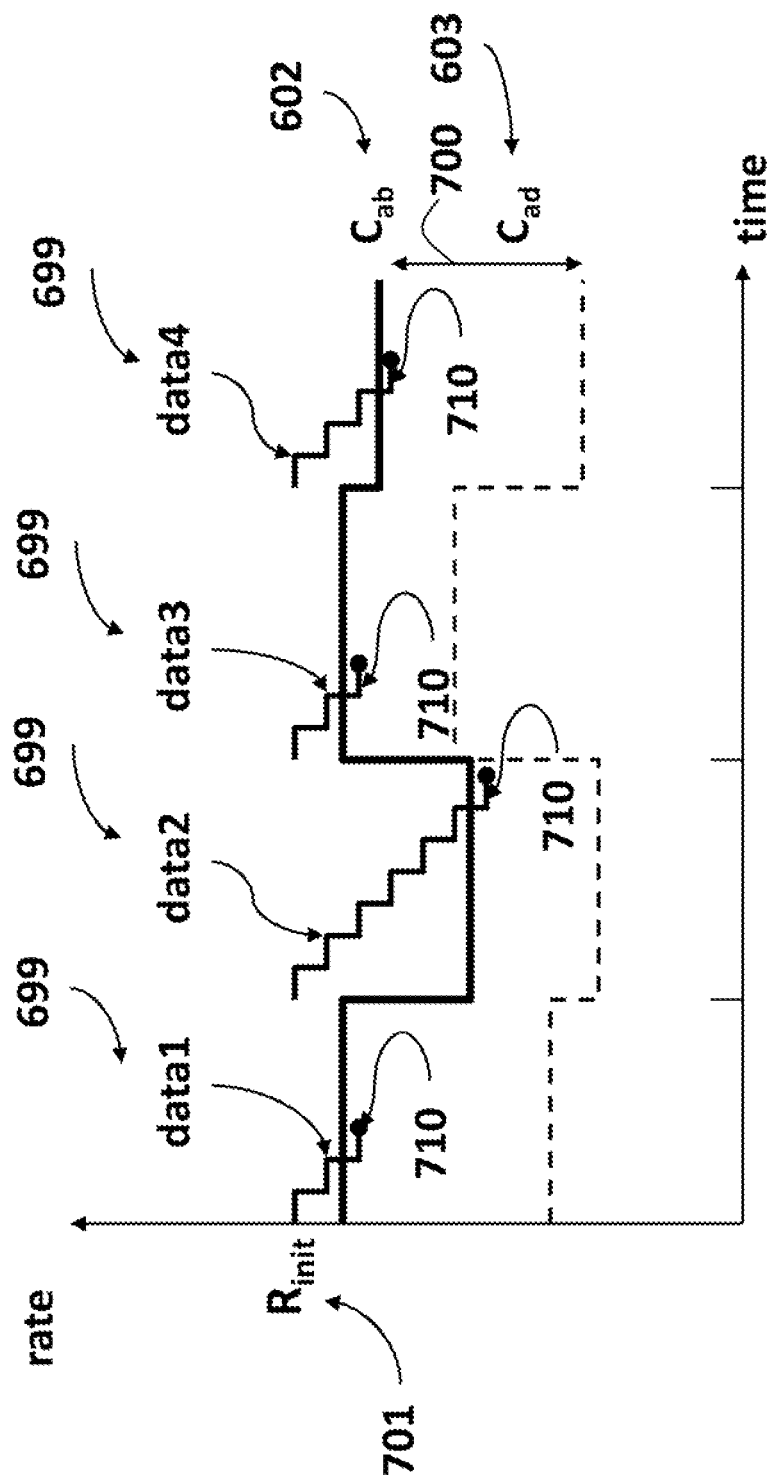
FIG. 7 is a timing diagram of rate and channel capacity using rate-adaptive codes according to embodiment of the invention.

FIG. 7 shows transmission using the embodiments of the invention. By scrambling the transmitted data with keys, the separation 700 between the effective legitimate channel capacity $C_{ab}$ 602 and the eavesdropper channel capacity $C_{ad}$ 603 is increased. For each segment of data 699, the transmitter starts transmission at rate $R_{init}$ 701, which is the highest possible transmission rate, e.g., $R_{init}$ can be set high, such as 1. With each additional transmission, the effective rate 710 is lower.

When the rate is lower than the channel capacity $C_{ab}$ 602 (solid line), and the receiver can decode the data correctly, the transmission stops. This allows the rate to be adaptive to instantaneous channel capacity, and guarantees that only the intended receiver can receive the message successfully and minimizes the probability of the data being decoded by the eavesdropper.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for communicating data between a transmitter and a receiver in a wireless network, comprising:
   estimating a first channel response between the transmitter and the receiver at the transmitter;
   generating a first key based on the first channel response;
   encoding the data at the transmitter to produce encoded data, wherein the encoding uses a rate-adaptive code;
   scrambling the encoded data using the first key to produce scrambled data; and
   broadcasting the scrambled data,
   generating additional symbols representing the data to increase redundancy of the data according to the rate-adaptive code, in response to receiving a feedback from the receiver indicating a decoding failure;
   scrambling and broadcasting the additional symbols with the first key; and
   repeating the generating, the scrambling and the broadcasting the additional symbols until a feedback indicating a decoding success is received.

2. The method of claim 1, further comprising:
   estimating a second channel response between the transmitter and the receiver at the receiver;
   generating a second key based on the second channel response;
   descrambling the scrambled data received by the receiver using the second key to produce descrambled data; and
   decoding the descrambled data.

3. The method of claim 2, wherein the first key and the second key are highly correlated but not identical.

4. The method of claim 2, wherein the receiver uses a soft descrambling method when reliability information is available.

5. The method of claim 4, wherein the reliability information is for the first key and the second key.

6. The method of claim 4, wherein the reliability information is for the descrambled data.

7. The method of claim 1, wherein the scrambling is a one-way function, such as exclusive OR of binary data, phase rotation of complex values.

8. The method of claim 1, wherein the encoding is performed using an encoder, and wherein the encoder includes an inner encoder and an outer encoder, and the scrambling is performed on an output of the outer encoder.

9. The method of claim 1, wherein the encoding is performed using an encoder, and wherein the encoder includes an inner encoder and an outer encoder, and the scrambling is performed on an output of the inner encoder output to produce input for the outer encoder.

10. The method of claim 1, wherein the transmitter continuously broadcasts the scrambled data until the scrambled data received at the receiver is decoded successfully.

11. The method of claim 1, wherein the rate-adaptive code is a rateless code, a rate-compatible low density parity check code, or a convolutional code.

12. A wireless communication network, comprising:
   a transmitter broadcasting data encoded using a rate-adaptive code and then scrambled by a first key based on a first channel response estimated between the transmitter and a receiver at the transmitter, and wherein the receiver descrambles received data using a second key based on a second channel response estimated between the transmitter and the receiver at the receiver, wherein the transmitter continuously generates, scrambles and broadcasts additional symbols of the data until a feedback indicating a decoding success is received.

* * * * *